Dec. 23, 1947.   N. LESTER   2,433,132
INJECTION MOLDING CONTROL APPARATUS
Filed Dec. 13, 1943   2 Sheets-Sheet 1

INVENTOR.
NATHAN LESTER
BY
Oberlin, Limbach + Day.
ATTORNEYS

INVENTOR.
NATHAN LESTER
BY
Oberlin, Limbach & Day
ATTORNEYS

Patented Dec. 23, 1947

2,433,132

UNITED STATES PATENT OFFICE 2,433,132

INJECTION MOLDING CONTROL APPARATUS

Nathan Lester, Cleveland Heights, Ohio, assignor to Lester Engineering Company, Cleveland, Ohio, a corporation of Ohio Application December 13, 1943, Serial No. 514,039

7 Claims. (Cl. 18—30)

The present invention relates to an apparatus particularly adapted to carry out such method, for controlling the application of motivating pressure in a pressure casting, or injection molding machine. In such injection molding machine operation, whether the material to be molded is a metal, metallic alloy, or plastic material, there is involved a certain phenomenon incident to the transfer under pressure of the fluid or semi-fluid material from the injection cylinder to the die cavity. This phenomenon is analogous to that principle upon which the operation of a hydraulic press is based. In other words, as the material to be molded is forced under pressure from the injection nozzle into the die cavity, and then fills such cavity, the total force exerted against the walls of the cavity is equal to the product of the pressure per unit area of the material entering the cavity (or at the injection nozzle) and the surface area of the die cavity.

Since a die cavity is customarily formed by separable die blocks or mold halves, in order that the molded article may be removed after solidification and the end of the pressure casting operation, the internal pressure generated therein results in a tendency to separate the die halves at the parting line. Such separating pressure is approximately equal to the area of the mold cavity times the pressure per unit area of the flowable material introduced into the mold cavity.

In the modern trend to design and construct pressure casting machines of increased mold size capacity, the problem and difficulties incident to the separating force generated between the mold halves become increasingly acute. As a general rule, it may be said that the mold separating force varies as the square of its cross sectional dimensions. Hence, where the die size is doubled, the strength of the molding machine frame and die locking mechanism would have to be made four times as strong to accommodate safely the separating force generated between the mold halves during injection.

If the mold separating force is greater than the strength of the machine frame and the locking pressure holding the mold halves together, the material would be forced out between the parting line.

An additional disadvantage is to be found in the distortion of the molded article from its specified dimensions, and also the creation of an undesirable "flash" on the molded article on the parting line.

The employment of high injection pressure is desirable in the pressure casting and injection molding art. In my copending applications Serial No. 340,834, filed June 15, 1940, I have taught that it is desirable to maintain a holding pressure upon the material being molded, during the critical time when such material has filled the die cavity and is being transformed from the fluid or plastic state into the solidified state. Therefore, the problem is presented of operating with high injection pressures and at the same time avoiding the hazards and detriments of such pressures.

My present invention has solved this problem by providing an automatic control of the injection pressure, such control in turn being initiated or actuated by any slight, minute separating movement of the mold halves.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing—

Figure 1:
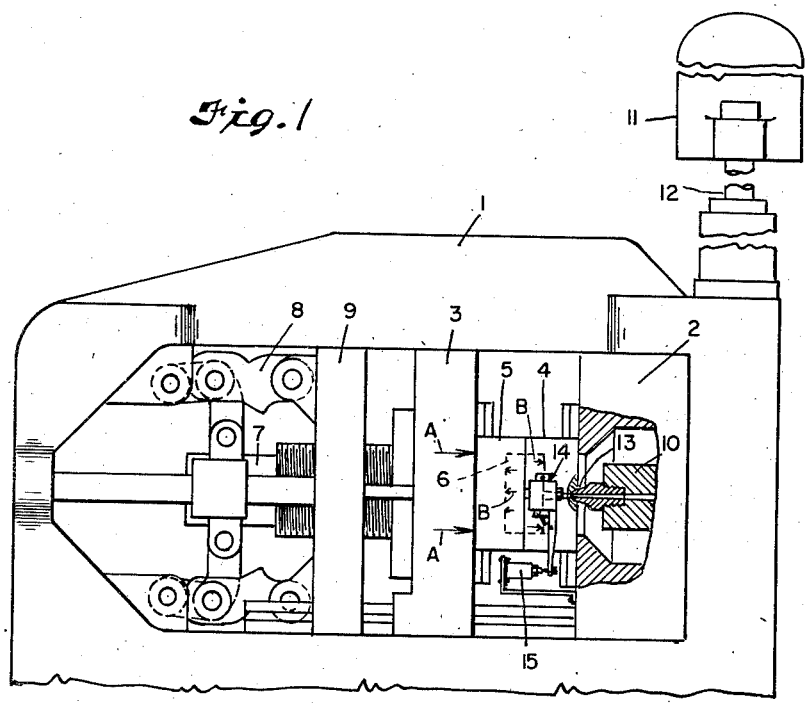
Fig. 1 is an elevational view of a pressure casting machine, illustrating the forces exerted and generated during the molding operation and showing the control mechanism embodying the principle of my invention as applied to such machine.

Now referring more particularly to Fig. 1 of the drawing, there is shown therein a known form of pressure casting machine comprising the frame 1, the fixed or stationary die plate 2, and the movable die plate 3. Separable mold halves or die blocks 4 and 5 are mounted on the die plates 2 and 3, respectively, forming the die cavity 6 therebetween. A hydraulic cylinder 7 operates the toggle link mechanism 8 which in turn functions to move the link plate 9 back and forth. The movable die plate 3 is carried by the plate 9, and thus the die blocks 4 and 5 are, in a manner previously known in the art, movable from open or separated position, to the locked, closed position as shown in Fig. 1.

The pressure casting machine also includes a pressure casting cylinder 10 having a plunger (not shown) reciprocable therein, such plunger deriving its prime movement from the piston rod 12 of the hydraulic cylinder and piston indicated at 11. The pressure cylinder 10 has an injection nozzle 13 communicating with the gate leading into the die cavity 6.

The arrows A in Fig. 1 indicate the direction of, and application of, the locking pressure which is exerted against the mold halves or die blocks 4 and 5 to hold them into contact with each other along their meeting surfaces or parting line, during the pressure casting operation. The small arrows B in Fig. 1 represent the separating force which is generated within the mold cavity 6 and tending to counteract the die locking pressure A.

A device for magnifying any slight or minute separating movement of the die blocks 4 and 5 is indicated at 14. This device 14 is adapted to actuate an electric "micro-switch" 15.

Figure 2:
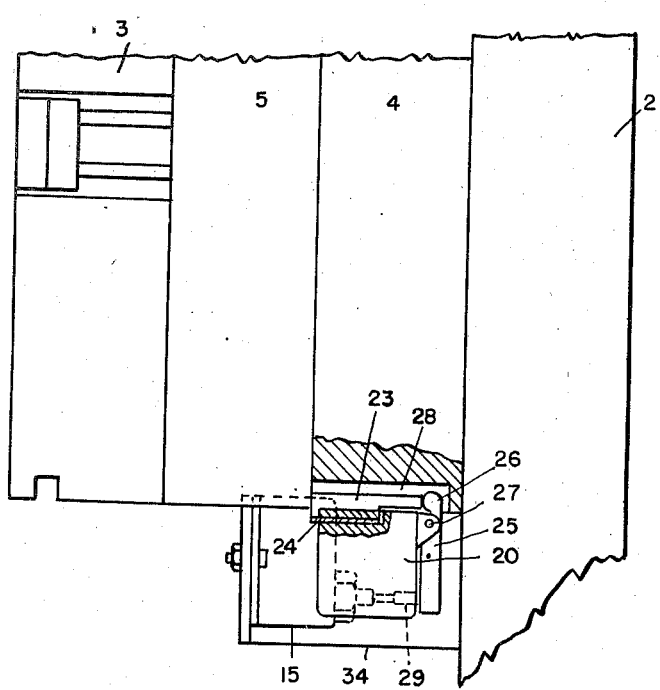
Fig. 2 is an enlarged, detailed view of the die blocks taken upon a plane normal to that of Fig. 1.

The detailed construction of the movement magnifying device 14 is shown in Fig. 2. It is composed of a supporting bracket or casting 20 which is adjustably mounted upon the die block 4 by means of the lateral bosses 21 and the screws 22 passing through the elongated slots in such bosses. A contacting slide 23 makes a suitable interlocking, sliding fit in the bracket 20, such as by the T-slot fit indicated at 24. One end of the slide 23 contacts with the parting line surface of the die blocks 5, and the other end of the slide 23 contacts with the short end of the lever 25, as indicated at 26. The lever 26 is pivotally mounted upon the pin 27 which is carried by projecting ears on the casting 20.

A recess 28 is provided in the outer wall of the die block 4 to accommodate the slide 23 and an inner end of the lever 25.

The long end of the lever 25 in turn contacts with the short end of the lever 29 whose pivotal axis or fulcrum (located at the mounting pin 30) is disposed at right angles to the mounting pin 27 of the lever 25. A tension spring 31 urges the lever 29, the lever 25 and the slide 23 in such a direction as to hold the slide 23 in contact with the die block 5.

The lever 29 has an adjustable set screw 32 mounted at the extremity of its long end, such set screw being in turn adapted to contact the plunger 33 of the "micro-switch" 15. An angle bracket 34 suitably mounts the "micro-switch" 15 upon the stationary die plate 2 and in fixed relationship with respect to the die block 4.

The leverage or mechanical advantage of the lever 25 is suitably made to be in the ratio of 5 to 1, and that of the lever 29 in the ratio of 10 to 1. Thus, for example, a movement of the slide 23 will be fifty times magnified at the outer end of the lever 29. Inasmuch as electric "micro-switches" are sensitive to movements of .0005–.001 in., a corresponding movement of 0.00001 to 0.0002 in. in the slide 23 will be sufficient to actuate the "micro-switch" 15.

Figure 4:
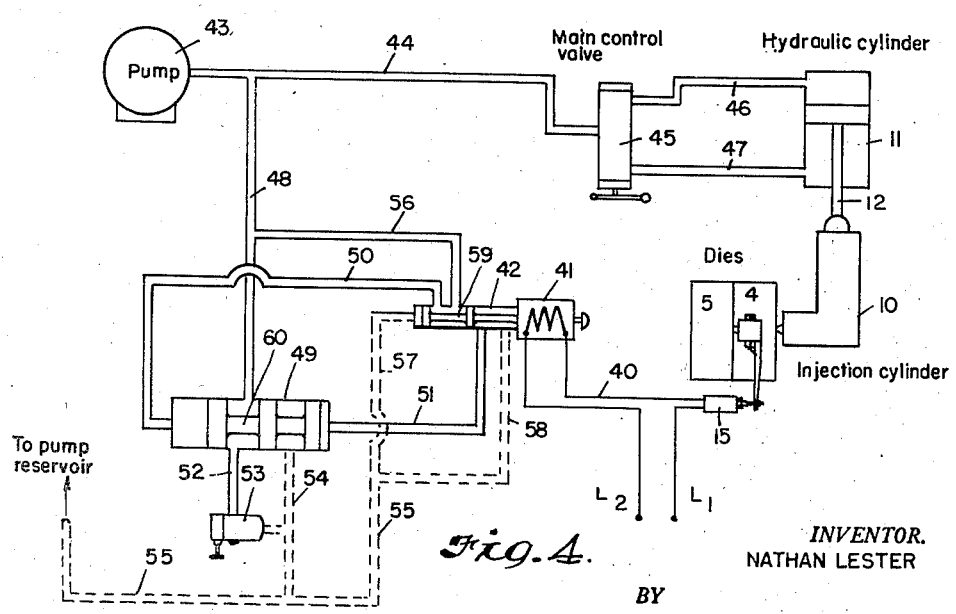
Fig. 4 is a diagram of the control system.
Figure 3:
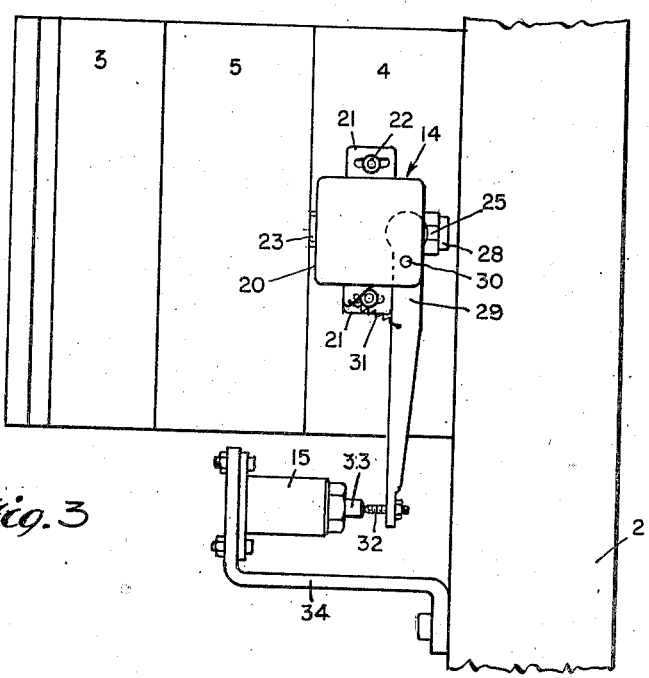
Fig. 3 is a view similar to that of Fig. 2 but a side elevation thereof.

The diagram of Fig. 4 shows the hydraulic and electrical connections of the control system interconnecting the foregoing described elements of the apparatus and adapted to perform the method embodying the principle of my invention. The "micro-switch" 15 is electrically connected in series from an electric power source through the lines L1 and L2 and the wire 40, to the solenoid 41 which operates the pilot valve 42.

A pressure source, such as the hydraulic pressure pump indicated at 43, is connected by means of the main pressure line 44 to the main control valve 45. The latter valve in turn selectively introduces pressure through the lines 46 and 47 to the head end or rod end, respectively, of the hydraulic cylinder 11. A branch line 48 leads from the main pressure line 44 to the valve 49. Pressure actuating lines 50 and 51 lead from each end of the valve 49 to the pilot valve 42. The line 52 leads from the valve 49 through the adjustable pressure relief valve 53 to the exhaust line 54 connecting to the main exhaust line 55 leading back to the reservoir of the pump 43. A branch pressure line 56 leads from the line 48 to the valve 42. Relief lines 57 and 58 also connect the pilot valve 42 to the main relief line 55.

The performance of the control method of my invention will be conveniently understood by tracing the sequence of operations of the last described control system, in conjunction with the previously described apparatus:

When the die blocks 4 and 5 are locked in closed position, the material to be molded, whether of metallic or plastic character, is injected from the pressure cylinder 10 into the die cavity 6. This is, of course, accomplished by actuation of the main control valve 45 to a position wherein the pressure is introduced from the main pressure line 44 to the head end of the hydraulic cylinder 11. The fluid, semi-fluid or plastic material then proceeds to fill the mold cavity 6. The valve 49 is in the position as shown in Fig. 4, wherein the branch line 48 is in communication with the line 52 and the relief valve 53. The relief valve is set at a predetermined pressure corresponding to the pressure per unit area which is desired to be exerted upon the material being injected from the pressure cylinder 10 and into the die cavity 6.

In the event that the total pressure against the inner surfaces of the die cavity 6 in a direction opposite to that of the die locking or clamping force A, and tending to separate the die blocks 4 and 5, becomes greater than such clamping force, then any slight separating movement of the die blocks 4 and 5 will be magnified and transmitted through the device 14 to actuate the "micro-switch" 15. Any such slight separating movement, as minute as one one-hundred thousandths inch (.00001 in.), is sufficient to cause such actuation of the "micro-switch" 15. Upon actuation of the "micro-switch" 15, the solenoid 41 is in turn operated to move the piston or spool 59 of the pilot valve 42 in a right-hand direction from that shown in Fig. 4, whereupon the pressure line 56 is placed in communication with the pilot line 51 leading to the right-hand end of the valve 49. This pressure introduced into the right-hand end of the valve 49 shifts its piston or spool 60 in a left-hand direction, whereupon pressure from the line 48 and the main line 44 is connected to the exhaust line 54. Thus, exhausting the main line pressure automatically reduces the prime moving pressure in the hydraulic cylinder 11 and the pressure within the die cavity 6, so that no disruptive or undesired separating movement of the die blocks 4 and 5 can occur during that critical period of time when the flowable material within such cavity is in a condition to effectuate the exertion of a separating force greater than the die block clamping force. As soon as the minute separating movement of the die blocks 4 and 5 is overcome by the clamping pressure on them, due to such release of the injection pressure, the device 14, "micro-switch" 15, solenoid 41, pilot valve 42 and valve 49 are reversely actuated, to restore the original operative condition, if such is found necessary to complete the injection working stroke of the machine. This situation might well arise where the material within the die cavity 6 has partially solidified around its outer zones, thus reducing the total pressure effective to separate the die blocks, so that the resumption of continued injection pressure from the cylinder 10 is within safe limits, or below the total die locking or clamping pressure.

It will thus be seen that my above described invention results in the assurance of safety, while at the same time solving the problem of filling the mold cavity under the desired predetermined pressure per unit area and permitting a holding pressure to be maintained during solidification.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:

1. In a pressure molding machine, the combination of separable die blocks, a pressure cylinder and plunger therein for forcing material to be molded into the mold cavity formed by said die blocks, a hydraulic cylinder and piston therein, said piston being connected to said plunger, a pressure source connected to said hydraulic cylinder, a control valve for regulating the pressure supplied to said hydraulic cylinder, an electric solenoid for actuating said control valve, and an electric micro-switch electrically connected to said solenoid, a lever mechanism fulcrumed on one of said die blocks and connected, at the opposite sides of its fulcrum, to the other of said die blocks and to said micro-switch, respectively, whereby minute movement of said die blocks operates to actuate said switch.

2. In a pressure molding machine, the combination of separable die blocks, a pressure cylinder and plunger therein for forcing material to be molded into the mold cavity formed by said die blocks, a hydraulic cylinder and piston therein, said piston being connected to said plunger, a pressure source connected to said hydraulic cylinder, a control valve for regulating the pressure supplied to said hydraulic cylinder, an electric solenoid for actuating said control valve, an electric micro-switch electrically connected to said solenoid, a lever supporting bracket mounted on one of said die blocks, a pair of levers pivotally mounted on said bracket, each of said levers having a short arm and a long arm, the long arm of one of said levers bearing against the short arm of the other, the short arm of said one of said levers being connected to the other of said die blocks, and the long arm of said other of said levers being adapted to actuate said switch.

3. In a pressure molding machine, the combination of separable die blocks, a pressure injection chamber communicating with the mold cavity formed by said blocks, pressure-providing means associated with said chamber for forcing molding material into the mold cavity, and control means associated with at least one of said blocks and said pressure-providing means for regulating the pressure exerted in said pressure chamber, said control means being actuated by minute separating movement of said blocks.

4. In a pressure molding machine, the combination of separable die blocks, a pressure injection chamber communicating with the mold cavity formed by said blocks, pressure-providing means associated with said chamber for forcing molding material into the mold cavity, and control means associated with at least one of said blocks and said pressure-providing means for reducing the pressure exerted in said pressure chamber in response to minute separating movement of said blocks.

5. In a pressure molding machine, the combination of separable die blocks, an injection cylinder having communication with the mold cavity formed by said blocks, a plunger reciprocable in said cylinder for forcing molding material from said cylinder into such mold cavity, fluid pressure actuating means associated with said plunger, and control means associated with at least one of said blocks and said actuating means for reducing the fluid pressure in response to minute separating movement of said blocks.

6. In a pressure molding machine, the combination of separable die blocks, an injection cylinder having communication with the mold cavity formed by said blocks, a plunger reciprocable in said cylinder for forcing molding material from said cylinder into such mold cavity, fluid pressure actuating means associated with said plunger, a control valve associated with said means operative to regulate the pressure supplied thereto, and control valve operating means connected to at least one of said blocks and to said valve for operating said valve in response to minute separating movement of said blocks.

7. In a pressure molding machine, the combination of separable die blocks, an injection cylinder having communication with the mold cavity formed by said blocks, a plunger reciprocable in said cylinder for forcing molding material from said cylinder into such mold cavity, fluid pressure actuating means associated with said plunger, an electrically operated control valve associated with said means operative to regulate the pressure supplied thereto, and an electric valve operating switch connected to at least one of said blocks and to said valve, said switch being actuated by minute separating movement of said blocks.

NATHAN LESTER.

REFERENCES CITED

The following references are of record in the file of this patent:

UNITED STATES PATENTS

| Number | Name | Date |
| --- | --- | --- |
| 1,997,074 | Novotny | Apr. 9, 1935 |
| 2,334,372 | Abbott et al. | Nov. 16, 1943 |
| 2,372,833 | Jobst | Apr. 3, 1945 |